US012634323B2

(12) United States Patent
Yadav et al.

(10) Patent No.: US 12,634,323 B2
(45) Date of Patent: May 19, 2026

(54) METHODS AND SYSTEMS FOR ATTACK GENERATION ON DATA LAKES

(71) Applicant: Theom, Inc., San Jose, CA (US)

(72) Inventors: Navindra Yadav, Cupertino, CA (US); Supreeth Hosur Nagesh Rao, Cupertino, CA (US); Ravi Kanth Sankuratri, Cupertino, CA (US); Danesh S. Irani, San Carlos, CA (US); Alok Lalit Wadhwa, Milipitas, CA (US); Vasil Dochkov Yordanov, San Jose, CA (US); Venkateshu Cherukupalli, West Windsor, NJ (US); Yiwei Wang, San Jose, CA (US); Zhiwen Zhang, San Jose, CA (US); Udayan Pramod Joshi, Cupertino, CA (US)

(73) Assignee: Theom, Inc., San Jose, CA (US)

( * ) Notice: Subject to any disclaimer, the term of this patent is extended or adjusted under 35 U.S.C. 154(b) by 0 days.

(21) Appl. No.: 18/203,045

(22) Filed: May 29, 2023

(65) Prior Publication Data

US 2025/0373641 A1     Dec. 4, 2025

Related U.S. Application Data

(63) Continuation-in-part of application No. 17/335,932, filed on Jun. 1, 2021, now Pat. No. 12,010,124.

(60) Provisional application No. 63/439,579, filed on Jan. 18, 2023, provisional application No. 63/153,362, filed on Feb. 24, 2021.

(51) Int. Cl.
*H04L 9/40* (2022.01)

(52) U.S. Cl.
CPC ...... *H04L 63/1433* (2013.01); *H04L 63/1466* (2013.01); *H04L 63/1475* (2013.01)

(58) Field of Classification Search
CPC ............ H04L 63/1433; H04L 63/1466; H04L 63/1475
See application file for complete search history.

(56) References Cited

U.S. PATENT DOCUMENTS

| | | | | |
|---|---|---|---|---|
| 10,769,045 | B1 * | 9/2020 | Sharifi Mehr | ........ G06F 21/552 |
| 10,826,928 | B2 * | 11/2020 | Carey | ................... H04L 63/102 |
| 2007/0142030 | A1 * | 6/2007 | Sinha | ................. H04L 63/1433 455/410 |

* cited by examiner

*Primary Examiner* — Thaddeus J Plecha
(74) *Attorney, Agent, or Firm* — Young Basile Hanlon & MacFarlane, P.C

(57) ABSTRACT

In one aspect, a computerized method for attack generation on a data lake, comprises: for a data lake repository: providing an attack generation mimicry tool; with the attack generation mimicry tool: implementing a reconnaissance phase attack generation; implementing an infiltration phase attack generation on the data lake repository; implementing a hiding and data intelligence collection phase of the attack by hiding from any monitoring or notification system of the data lake repository and surveying the data lake repository to determine what data is worth abusing or exfiltrating from the data lake repository; implementing data gathering phase of the attack that gathers data about other objects, attributes, and relationships in the data lake repository; and implementing the exfiltration of the data or the abuse of the data.

20 Claims, 7 Drawing Sheets

ENABLE MIMICRY OF ATTACKER TECHNIQUE(S)
102

GENERATE/PROVIDE DIFFERENT ATTACK TECHNIQUES WITH A VARIED AMOUNT OF
TIMING CONSTRAINTS
104

CREATE DIFFERENT DATA ABUSE SCENARIOS TO MEASURE THE EXTENT OF DATA
ABUSE
106

MIMIC IDENTITIES THAT ARE COMPROMISED AND EXHIBIT DIFFERENT BEHAVIORAL
PATTERNS
108

100

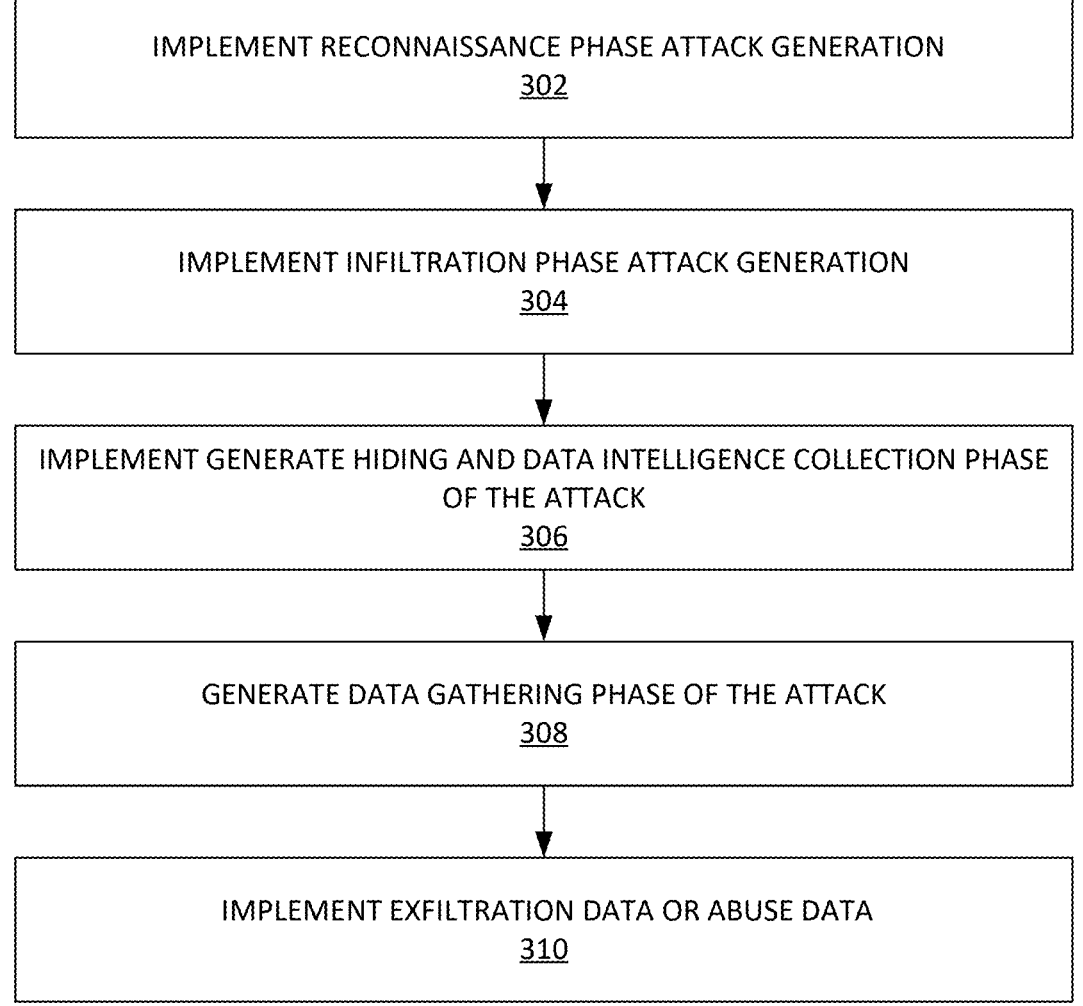
IMPLEMENT RECONNAISSANCE PHASE ATTACK GENERATION
302
IMPLEMENT INFILTRATION PHASE ATTACK GENERATION
304
IMPLEMENT GENERATE HIDING AND DATA INTELLIGENCE COLLECTION PHASE
OF THE ATTACK
306
GENERATE DATA GATHERING PHASE OF THE ATTACK
308
IMPLEMENT EXFILTRATION DATA OR ABUSE DATA
310
300
FIGURE 3

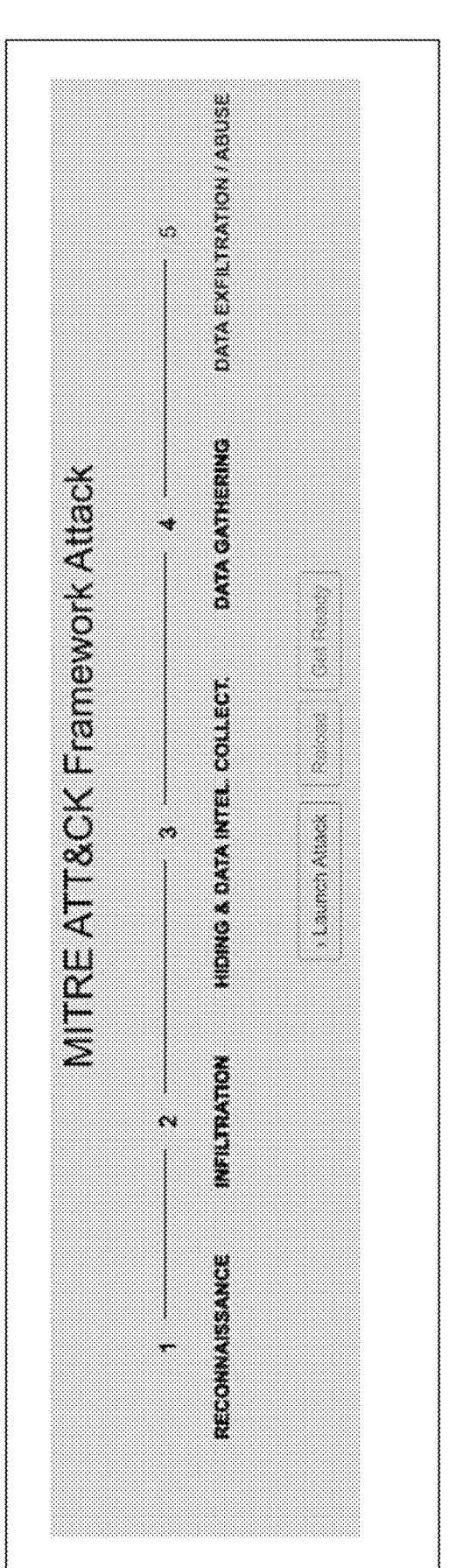
MITRE ATT&CK Framework Attack
1 — 2 — 3 — 4 — 5
RECONNAISSANCE     INFILTRATION     HIDING & DATA INTEL. COLLECT.     DATA GATHERING     DATA EXFILTRATION / ABUSE
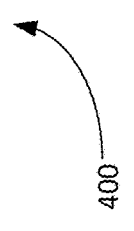
FIGURE 4
400

```
> Setting up the environment...
> All set, ready to execute
> Trying to log in using phished credentials for theom-zts-demo@theom.ai with role ACCOUNTADMIN in account nxb73175

================ INFILTRATION ================
  ● Infiltration: 1> Create new role dbas_2023_03_24_06_35_PM and assign pwnd user theom-zts-demo@theom.ai for persistence ✔
  ● Infiltration: 2> Disabling SOC notification email temporarily ✔
  ● Infiltration: 3> Altering network policy to add backdoor for our IP address ✔
  ● Infiltration: 4> Create an anonymous procedure to copy out a sample for data validity ✔
  ● Infiltration: 5> Create a resident procedure to update network policy with the backdoor IP address ✔
  ● Infiltration: 6> Create scheduled job to update network policy for maintaining persistence ✔
================ INFILTRATION END ================

================ HIDING AND DATA INTELLIGENCE COLLECTION ================
  ● Hiding: 1> Dropping network policy ✔
  ● Hiding: 2> Dropping SOC notification email integration ✔
================ HIDING AND DATA INTELLIGENCE COLLECTION END ================

================ DATA GATHERING ================
  ● Data Gathering: 1> Discovering and enumerating... ✔
  ● Data Gathering: 1.1>... databases ✔
  ● Data Gathering: 1.2>... schemas ✔
  ● Data Gathering: 1.3>... tables ✔
  ● Data Gathering: 1.4>... columns ✔
  ● Data Gathering: 1.5>... tasks ✔
  ● Data Gathering: 1.6>... functions ✔
  ● Data Gathering: 1.7>... grants ✔
  ● Data Gathering: 1.8>... roles ✔
  ● Data Gathering: 1.9>... users ✔
  ● Data Gathering: 1.10>... external tables ✔
  ● Data Gathering: 1.11>... external functions ✔
================ DATA GATHERING END ================
```

---- EXFILTRATION STAGE ----

○ Exfiltration 1> Copy patent database to public systems ✔
○ Exfiltration 2> Create an internal stage and copy patent data ✔
○ Exfiltration -- Done copying ✔
○ Exfiltration- Stop internal stage ✔
○ Exfiltration 3> Alter S3 stage and start exfiltrating data to shared bucket ✔
○ Exfiltration 4> Use our key to encrypt prend data ✔
---- EXFILTRATION STAGE END ----

Sample of the compromised data content:

| | COL_0 | COL_1 | COL_2 | _COL_3 | _COL_3 | _COL_4 | _COL_5 | _COL_6 |
|---|---|---|---|---|---|---|---|---|
| 0 | 0.9080 | 448328 | Isaiah Frazier | 4846 Donovan Stream Apt. 963\nNorth Paigeton, FL 63772 | 111-818-9281x22063 | 881595 | 881695 | C98631 |
| 1 | 862771 | 1446 | Justin Smith | USS Brown\nFPO AE 13403 | +1-744-218-1898x205 | 824800 | 824800 | X9355 |
| 2 | 4591 | 106173 | April Nichols | 484 Smith Islands\nPort Blanborough, OR 41478 | +1-455-587-8295 | 869478 | 869478 | C11823 |
| 3 | 3494 | 403233 | Anthony Pang | 61824 Wendy Dale\nSouth Courtneytown, HI 40867 | (409)362-2785 | 922836 | 922836 | C98631 |
| 4 | 1579 | 13966 | Tom Williams | 57385 Kevin Points Suite 836\nSouth Jeffery, AK 43126 | (591)818-9840x2200 | 818300 | 818300 | V25398 |

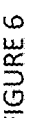

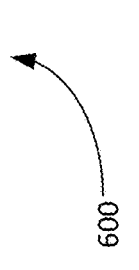

Attack launched successfully in 0:02:15.902488 seconds. ★ ★★

METHODS AND SYSTEMS FOR ATTACK GENERATION ON DATA LAKES

CLAIM OF PRIORITY

This application claims priority to U.S. Provisional Application No. 63/439,579, filed on 18 Jan. 2023 and titled DATA STORE ANALYSIS METHODS AND SYSTEMS. This provisional application is hereby incorporated by reference in its entirety.

This application claims priority to the U.S. patent application Ser. No. 17/335,932, filed on Jun. 1, 2021 and titled METHODS AND SYSTEMS FOR PREVENTION OF VENDOR DATA ABUSE. The U.S. patent application Ser. No. 17/335,932 is hereby incorporated by reference in its entirety.

U.S. patent application Ser. No. 17/335,932 application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This utility patent application is incorporated herein by reference in its entirety.

FIELD OF INVENTION

This application is related to cloud-platform security and, more specifically, attack generation on data lakes.

BACKGROUND

Cyber-attacks can happen at any time. Mimicking an attacker provides strategies to help companies assess their current security posture, find gaps in the overall security strategy, and monitor, measure, detect, and fix issues. Mimicking attacker strategies and behaviors enable increased security robustness and attack detection capabilities based on the adage: "You can't fix what you can't measure."

SUMMARY OF THE INVENTION

In one aspect, a computerized method for attack generation on a data lake, comprises: for a data lake repository: providing an attack generation mimicry tool; with the attack generation mimicry tool: implementing a reconnaissance phase attack generation; implementing an infiltration phase attack generation on the data lake repository; implementing a hiding and data intelligence collection phase of the attack by hiding from any monitoring or notification system of the data lake repository and surveying the data lake repository to determine what data is worth abusing or exfiltrating from the data lake repository; implementing data gathering phase of the attack that gathers data about other objects, attributes, and relationships in the data lake repository; and implementing the exfiltration of the data or the abuse of the data.

BRIEF DESCRIPTION OF THE DRAWINGS

FIG. 3 illustrates an example process for implementing a tool to mimic how an attacker behaves, according to some embodiments.

FIGS. 4-6 illustrates an example screenshots of an attack generation tool, according to some embodiments.

Figure 1:
FIG. 1 illustrates an example process for attack generation on data lakes, according to some embodiments.

The Figures described above are a representative set and are not exhaustive with respect to embodying the invention.

DESCRIPTION

Disclosed are a system, computerized method, and article for attack generation on data lakes. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. However, one skilled in the relevant art can recognize that the invention may be practiced without one or more of the specific details or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

CIA triad (confidentiality, integrity and availability) of information security.

Cloud computing is the on-demand availability of computer system resources, especially data storage (e.g. cloud storage) and computing power, without direct active management by the user.

Cloud database is a database that typically runs on a cloud computing platform and access to the database is provided as-a-service.

Cloud storage is a model of computer data storage in which the digital data is stored in logical pools, said to be on "the cloud". The physical storage spans multiple servers (e.g., in multiple locations), and a hosting company typically owns and manages the physical environment. These cloud storage providers can keep the data available and accessible, and the physical environment secured, protected, and running.

DBaaS (Database as a Service) can be a cloud computing service that provides access to and use a cloud database system.

Data exfiltration can be an operation where malware and/or a malicious actor carries out an unauthorized data transfer from a computer. Types of data that are targeted includes, inter alia: usernames, associated passwords, and other system authentication related information, information associated with strategic decisions, cryptographic keys, personal financial information, social security numbers and other personally identifiable information (PII), mailing addresses, etc.

Data lake is a system or repository of data stored in its natural/raw format. A data lake can be object blobs or files. A data lake is usually a single store of data including raw copies of source system data, sensor data, social data etc. A data lake can include various transformed data used for tasks such as reporting, visualization, advanced analytics, and machine learning. A data lake can include structured data from relational databases (rows and columns), semi-structured data (e.g. CSV, logs, XML, JSON), unstructured data (e.g. emails, documents, PDFs) and binary data (e.g. images, audio, video). A data lake can be established "on premises" (e.g. within an organization's data centers) or "in the cloud" (e.g. using cloud services from various vendors).

Network reconnaissance methods can be passive or active. Passive methods can include, inter alia: bug bounty program, sniffing attack, monitor mode, promiscuous mode, TCP/IP stack fingerprinting, footprinting, honeypots, etc. Active methods can include, inter alia: network enumeration, network scanning, port scanning, idle scanning, etc.

Tactics, techniques, and procedures (TTPs) are the "patterns of activities or methods associated with a specific threat actor or group of threat actors.

EXAMPLE METHODS

An attack generation mimicry tool to mimic an attacker in a lab environment is provided. The tool creates an attack scenario that leads to a data breach from a cloud data warehouse (e.g. Snowflake) and/or a data lake. The same tool/workflow methodology can be extended to cloud databases. The tool can utilize specified attack generation techniques that mimic data breach creation and is primarily used in cybersecurity to improve the resilience of systems. The tool can simulate malicious activities to identify systems vulnerabilities and help devise defense strategies. The tool identifying vulnerabilities. These techniques can mimic the actions of hackers, providing a real-time assessment of system vulnerabilities. This can help organizations patch these weaknesses before actual attackers exploit them.

The tool can be used to training machine learning models. Attack generation techniques can produce a wealth of varied data that can be used to train machine learning models. This can help create better intrusion detection systems, anomaly detection systems, and cybersecurity AI models.

The tool can be used testing existing security measures. By simulating various types of attacks, these techniques can help push the effectiveness of existing security measures and whether they can withstand different threats.

The tool can be used for risk assessment. By evaluating how the system reacts to different types of attacks, these techniques can help in risk assessment and in creating more effective incident response strategies. The tool can be used for regulatory compliance scenarios. Various industries have regulations that require businesses to conduct regular security audits and penetration testing. Attack generation can help meet these requirements.

The tool can be used for employee training. For example, simulated attacks can also provide realistic training scenarios for security teams, helping them learn how to respond to different threats. The tool can be used to help improve and build better detection techniques for cloud data security attack detection tools.

FIG. 1 illustrates an example process 100 for attack generation on data lakes, according to some embodiments. In step 102, process 100 enables a way to mimic the following attacker techniques. These can include, inter alia: reconnaissance, infiltration, hiding and data intelligence collection, data gathering, data exfiltration and abuse, etc.

In step 104, process 100 can generate/provide different attack techniques with a varied amount of timing constraints. In step 106, process 100 can create different data abuse scenarios to measure the extent of data abuse.

In step 108, process 100 can mimic compromised identities and exhibit different behavioral patterns. These can include, inter alia: different time of day, different data sets, different clients used to access, different locations of access, different query patterns, etc. It is noted that additional attack behavior patterns are detailed in the implementation section.

Figure 2:
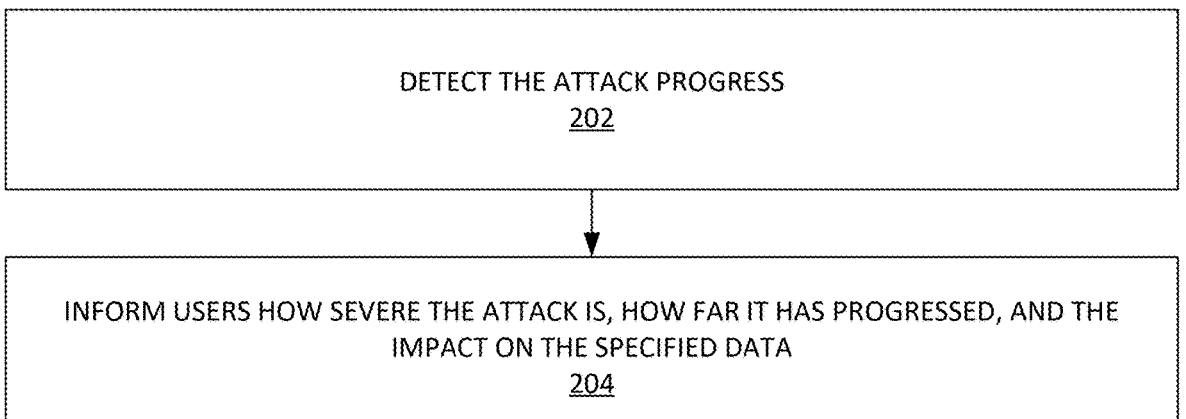
FIG. 2 illustrates another process, according to some embodiments.

FIG. 2 illustrates another process 200, according to some embodiments. In step 202, process 200 detects the attack progress associated with each of the above stages and sub-steps. Process 200 informs users how severe the attack is (e.g. in terms of a quantification metric, etc.), how far it has progressed, and the impact on specified data in step 204.

FIG. 3 illustrates an example process 300 for implementing a tool to mimic how an attacker behaves, according to some embodiments. Process 300 can be used to ensure the attack detection is working right and as expected.

The tool can mimic how an attacker behaves. It is noted that there are various attacker behaviors. These can be factored into what the tool functionalities. In some examples, the tool mimics the following attacker behaviors:

Unusual Access Times: If a user is accessing the database at a time that is not typical for them, this could be a sign of abnormal behavior. For example, if a user typically accesses the data store during regular business hours but suddenly starts accessing it late at night, this could indicate a potential issue;

Excessive Logins or Login Failures: If a user attempts to log in to the database an excessive number of times or multiple failed login attempts, this could be a sign of a brute force attack;

Unexpected Location Access: If a user is accessing the database from a location that is not typical for them, this could be a sign of abnormal behavior. This could be detected by monitoring IP addresses;

Anomalies in Data Queries: If a user runs queries that are not typical for their role or job function, this could indicate unauthorized behavior. For example, if a user is attempting to access confidential or sensitive data that they do not usually have access to;

High Data Volume Transfer: A sudden increase in the volume of data being downloaded or transferred could indicate data theft or a data breach;

Multiple Concurrent Sessions: If a user is logged in from multiple devices or locations simultaneously, this could be a sign of account sharing or a compromised account;

Changes in System or Database Configuration: Unusual or unauthorized changes to the database or system configuration can be a sign of an intruder attempting to establish persistence or create backdoors; and Privilege Escalation: If a user suddenly has increased permissions or is attempting to escalate their privileges, this could be a sign of abnormal behavior. These attack types are provided by way of example and not of limitation.

In step 302, process 300 can implement reconnaissance phase attack generation. Process 300 can generate probe and network access, authentication, and authorization settings. In this stage, the attackers are probing the network access controls and the authentication and authorization system settings. Process 300 can generate a variance in machine and human identity behaviors. Process 300 can use a generation tool that identifies human and machine-based probing attempts (e.g. attacks). Process 300 classifies their geolocation, IP address, ASN, etc., of where the probes are coming from. process 300 can compare this information with normal behavior. Process 300 can generate interest in new data stores from different locations. Process 300 can generate probe failure(s). Process 300 can study/analyze the type of probe failures to identify which user's account is being used and what type of probe failures are being picked up. This gives an early indicator of the set of TTPs the attacker may use.

In step 304, process 300 can implement infiltration phase attack generation. Process 300 can generate privilege escalation by creating/escalating into a privileged access role/group. In this phase of the attack, process 300 detects the attacker or malware entering into the data store, establishing persistence, or elevating its privilege to obtain access to the data of interest. Process 300 can gain access inside a data store. The first step starts with making the entry, that is, execution of the beachhead part of the attack. In this step, the attacker successfully gains a toehold inside the data store. Process 300 can establish persistence by setting up a permit rule or a network policy whitelist from within the store. After execution, the attackers or the malware often immediately try to establish persistence. Though persistence is not always required, this step is considered essential by most attackers or malware so that they can return back into the system if an unforeseen incident happens (e.g. Snowflake service is restarted/relocated or the network connection is dropped, etc.). Process 300 can grant sufficient privileges through the intermediate account. For example, the account with which the attacker or malware enters the system, often may not be highly privileged, or the entry account may not have the right privileges to obtain access to the data the attacker has an interest in (e.g. assuming the attacker knows what they are after from the very beginning, sometimes this step can occur after data intelligence collection). In cases like this, the attacker or malware has to execute a privilege elevation attack through one or more intermediate accounts or grant itself the right privileges until it obtains sufficient privileges to gain access to the data of interest. This step is called privilege escalation.

In step 306, process 300 can generate hiding and data intelligence collection phase of the attack. Process 300 can hide from any monitoring or notification. The tool mimics this specific attacker behavior. In this phase of the attack, the attacker or malware does two things, hides its presence from detection and surveys the data store to determine what data is worth abusing or exfiltrating from the data store. Process 300 can generate defense evasion signals. Process 300 can discover newer stores/credentials/integrations so that the attack generation tools can hide from other monitoring tools. The defense evasion step requires the attacker to hide himself or herself so that no one will notice their presence. This provides the attacker time to do their work with relative peace. Access credentials to discover the lay of the land, where the crown jewel data set exists. The credential access and Discovery step involve accessing the credential to the system and discovering the lay of the land (aka survey) inside the data store, as discussed above.

In step 308, process 300 can generate data gathering phase of the attack. Process 300 can gather data about other objects, attributes, and relationships in the store. The data gathering involves the attacker collecting the data of interest to the attacker stored inside the data store and preparing it for either exfiltration or abuse (e.g. an availability attack like ransomware or an integrity attack that modifies the data). Process 300 generate lateral movements across databases, tables, views. For example, the attacker can be required to do a sequence of lateral moves to locate the correct warehouse, database, or table using the appropriate roles. This movement is the lateral movement step and has to be executed before the data collection step.

In step 310, process 300 can implement exfiltration data or abuse data. Process 300 can delete data. The last step of the attack impacts the CIA (e.g. confidentiality, integrity, availability) triad of data. Data Exfiltration is an example of an attack on confidentiality. Data tampering or modification is an attack on the integrity of the data. Ransomware through data deletion or encryption is an attack on the availability of the data. Process 300 can dump data out. It is noted that data exfiltration is common with data breaches and so is ransomware. Detecting these two involve looking at ways the attacker communicates (e.g. command and control channel) with the malware inside the data store and also how does he/she take the data out of the data store. Stage changes to alter data/remove specific rows/add specific rows into data, to abuse the contents.

FIGS. 4-6 illustrates an example screenshots 400-600 of an attack generation tool, according to some embodiments. Screenshots 400-600 includes example details of various stage implementations.

Additional Computing Systems

Figure 7:
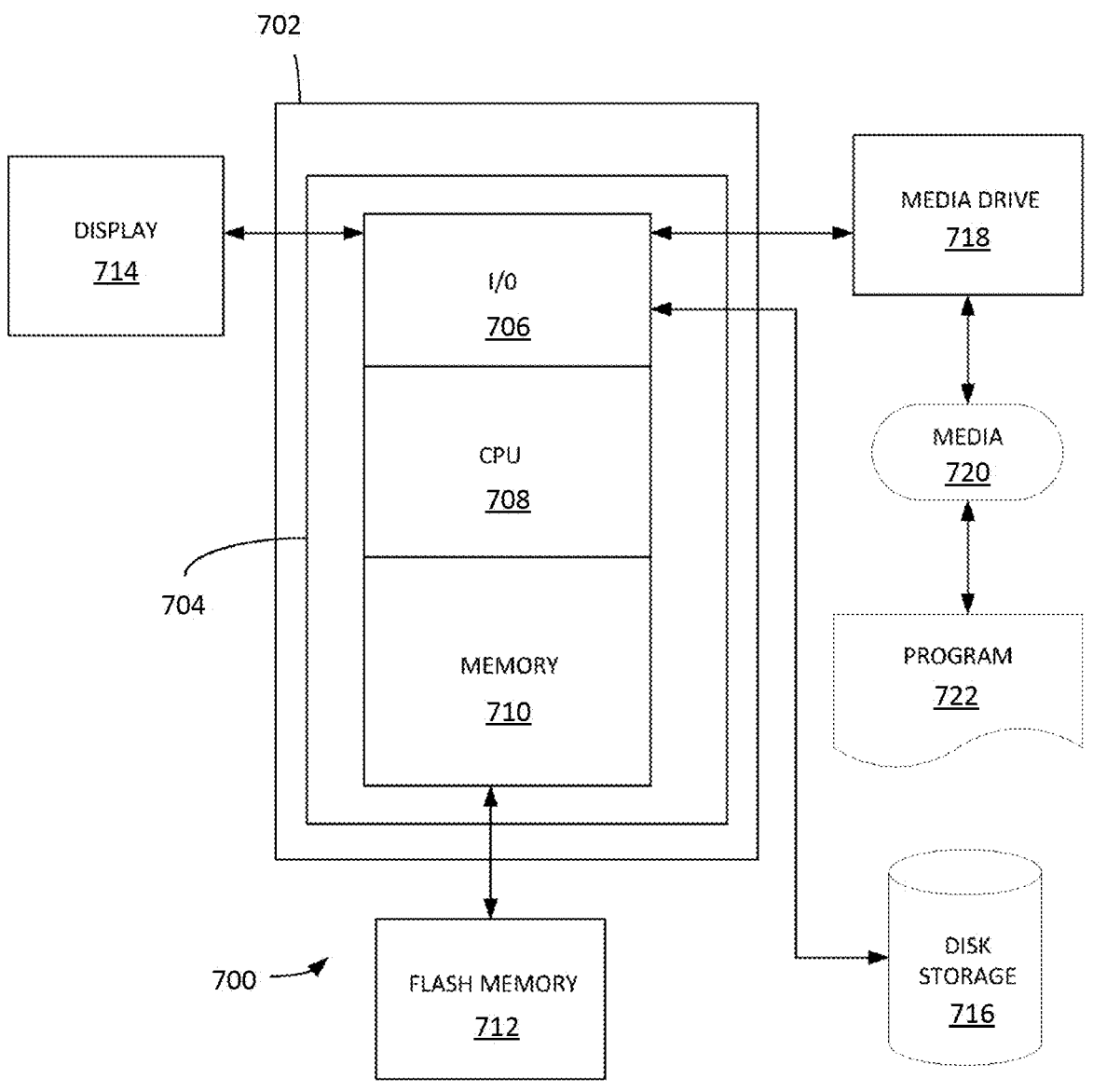
FIG. 7 depicts an exemplary computing system that can be configured to perform any one of the processes provided herein.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or another user input (not shown), a disk storage unit 716, and a media drive unit 718. The media drive unit 718 can read/write a computer-readable medium 720, which can contain programs 722 and/or databases. Computing system 700 can include a web browser. Moreover, it is noted that computing system 700 can be configured to include additional systems in order to fulfill various functionalities. Computing system 700 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by this United States patent:

1. A computerized method for attack generation on a data lake, comprising:

for a data lake repository:

providing an attack generation mimicry tool; and with the attack generation mimicry tool:

implementing a reconnaissance phase attack generation;

implementing an infiltration phase attack generation on the data lake repository;

implementing a hiding and data intelligence collection phase of an attack by hiding from a monitoring or notification system of the data lake repository and surveying the data lake repository to determine data to target for exfiltration from the data lake repository;

implementing data gathering phase of the attack that gathers data about objects, attributes, and relationships in the data lake repository other than the data targeted for exfiltration; and implementing the exfiltration of the data to target for exfiltration.

2. The computerized method of claim 1, wherein a data lake comprises a computerized repository of data stored in a raw format.

3. The computerized method of claim 1, wherein the data lake comprises a plurality of object blobs.

4. The computerized method of claim 1, wherein implementing the reconnaissance phase attack generation further comprises:

generating a probe and a network access controls, a network authentication, and a network authorization setting.

5. The computerized method of claim 4, wherein implementing the reconnaissance phase attack generation further comprises:

probing the network access controls, the network authentication and the network authorization setting; and generating a variance in machine and human identity behaviors.

6. The computerized method of claim 1, wherein implementing the infiltration phase attack generation on the data lake repository further comprises:

generating a privilege escalation by creating and escalating into a privileged access role.

7. The computerized method of claim 6, wherein implementing the infiltration phase attack generation on the data lake repository further comprises:

gaining access inside a data store of the data lake repository.

8. The computerized method of claim 1, wherein generating a hiding and data intelligence collection phase of the attack further comprises:

generating a plurality of defense evasion signals.

9. The computerized method of claim 8, wherein generating a hiding and data intelligence collection phase of the attack further comprises:

discovering a plurality of stores, a plurality of credentials and a plurality of integrations so that the attack generation tools hide from the monitoring tool of the data lake repository.

10. The computerized method of claim 1, wherein implementing data gathering phase of the attack that gathers data about objects, attributes, and relationships in the data lake repository further comprises:

collecting data to target for exfiltration stored inside the data lake repository and preparing the data to target for exfiltration for an exfiltration operation.

11. The computerized method of claim 1 further comprising:

deleting the exfiltrated data.

12. The computerized method of claim 11, wherein the deletion of the exfiltrated data impacts a CIA (confidentiality, integrity, availability) triad of the data.

13. A non-transitory machine-readable medium including a program that, when performed by a computer system, enables the computer system to:

for a data lake repository:

provide an attack generation mimicry tool; and with the attack generation mimicry tool:

implement a reconnaissance phase attack generation;

implement an infiltration phase attack generation on the data lake repository;

implement a hiding and data intelligence collection phase of an attack by hiding from a monitoring or notification system of the data lake repository and surveying the data lake repository to determine what data to target for exfiltration from the data lake repository;

implement a data gathering phase of the attack that gathers data about objects, attributes, and relationships in the data lake repository other than the data targeted for exfiltration; and implement the exfiltration of the data to target for exfiltration.

14. The non-transitory machine-readable medium of claim 13, wherein to implement the reconnaissance phase attack generation, the program further enables the computer system to:

generate a probe and a network access control, a network authentication, and a network authorization setting.

15. The non-transitory machine-readable medium of claim 13, wherein to implement the infiltration phase attack generation on the data lake repository, the program further enables the computer system to:

generate a privilege escalation by creating and escalating into a privileged access role.

16. The non-transitory machine-readable medium of claim 13, wherein to implement the hiding and data intelligence collection phase of the attack, the program further enables the computer system to:

generate a plurality of defense evasion signals.

17. A system for attack generation on a data lake, comprising:

one or more processors; and one or more memories connected to the one or more processors, the one or more memories including a program that, when executed by the one or more processors, enables the system to:

for a data lake repository:

provide an attack generation mimicry tool; and with the attack generation mimicry tool:

implement a reconnaissance phase attack generation;

implement an infiltration phase attack generation on the data lake repository;

implement a hiding and data intelligence collection phase of an attack by hiding from a monitoring or notification system of the data lake repository and surveying the data lake repository to determine what data to target for exfiltration from the data lake repository;

implement a data gathering phase of the attack that gathers data about objects, attributes, and relationships in the data lake repository other than the data targeted for exfiltration; and implement the exfiltration of the data targeted for exfiltration.

18. The system of claim 17, wherein the program further enables the system to:

delete the exfiltrated data.

19. The system of claim 17, wherein to implement the infiltration phase attack generation on the data lake repository, the program further enables the system to:

generate a privilege escalation by creating and escalating into a privileged access role.

20. The system of claim 17, wherein to implement the hiding and data intelligence collection phase of the attack, the program further enables the system to:

generate a plurality of defense evasion signals.

* * * * *